US009804601B2

(12) United States Patent
Lombrozo et al.

(10) Patent No.: US 9,804,601 B2
(45) Date of Patent: *Oct. 31, 2017

(54) INFERRING STATE OF TRAFFIC SIGNAL AND OTHER ASPECTS OF A VEHICLE'S ENVIRONMENT BASED ON SURROGATE DATA

(71) Applicant: Waymo LLC, Mountain View, CA (US)

(72) Inventors: Peter Lombrozo, Santa Cruz, CA (US); Eric Teller, San Francisco, CA (US); Bradley Templeton, Sunnyvale, CA (US)

(73) Assignee: Waymo LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/087,390

(22) Filed: Mar. 31, 2016

(65) Prior Publication Data

US 2016/0209844 A1 Jul. 21, 2016

Related U.S. Application Data

(63) Continuation of application No. 14/308,409, filed on Jun. 18, 2014, now Pat. No. 9,327,734, which is a (Continued)

(51) Int. Cl.
*B60W 40/00* (2006.01)
*B60W 30/00* (2006.01)
(Continued)

(52) U.S. Cl.
CPC .......... *G05D 1/0088* (2013.01); *B60W 30/09* (2013.01); *B60W 30/12* (2013.01); *B60W 30/16* (2013.01);
(Continued)

(58) Field of Classification Search
CPC ...... B60W 40/00; B60W 40/04; B60W 30/16; B60W 30/12; B60W 2550/10; B60W 2550/20; G08G 1/0104
See application file for complete search history.

(56) References Cited

U.S. PATENT DOCUMENTS 5,963,148 A 10/1999 Sekine et al.
6,151,539 A 11/2000 Bergholz et al.
(Continued)

FOREIGN PATENT DOCUMENTS

DE 102005049458 4/2007
DE 102010049214 7/2011
(Continued)

OTHER PUBLICATIONS

European Patent Office, EP Partial Search Report dated Feb. 18, 2016, issued in connection with European Patent Application No. 13797850, 9 pages.
(Continued)

*Primary Examiner* — Michael J Zanelli
(74) *Attorney, Agent, or Firm* — McDonnell Boehnen Hulbert & Berghoff LLP

(57) ABSTRACT

A vehicle configured to operate in an autonomous mode can obtain sensor data from one or more sensors observing one or more aspects of an environment of the vehicle. At least one aspect of the environment of the vehicle that is not observed by the one or more sensors could be inferred based on the sensor data. The vehicle could be controlled in the autonomous mode based on the at least one inferred aspect of the environment of the vehicle.

20 Claims, 9 Drawing Sheets

Related U.S. Application Data continuation of application No. 13/486,886, filed on Jun. 1, 2012, now Pat. No. 8,793,046.

(51) Int. Cl.

| | | |
|---|---|---|
| *G05D 1/00* | (2006.01) | |
| *B60W 30/12* | (2006.01) | |
| *B60W 30/16* | (2012.01) | |
| *G06K 9/00* | (2006.01) | |
| *B60W 30/09* | (2012.01) | |
| *G01S 13/88* | (2006.01) | |
| *G01S 15/88* | (2006.01) | |
| *G01S 17/88* | (2006.01) | |
| *B60W 50/00* | (2006.01) | |

(52) U.S. Cl.
CPC ............ *B60W 40/00* (2013.01); *G01S 13/88* (2013.01); *G01S 15/88* (2013.01); *G01S 17/88* (2013.01); *G06K 9/00825* (2013.01); *B60W 2050/0089* (2013.01); *B60W 2550/10* (2013.01)

(56) References Cited

U.S. PATENT DOCUMENTS

| | | |
|---|---|---|
| 6,470,272 B2 | 10/2002 | Cong et al. |
| 6,516,262 B2 | 2/2003 | Takenaga et al. |
| 7,177,760 B2 | 2/2007 | Kudo |
| 7,979,172 B2 | 7/2011 | Breed |
| 8,031,062 B2 | 10/2011 | Smith |
| 8,571,743 B1 | 10/2013 | Cullinane |
| 8,793,046 B2 | 7/2014 | Lombrozo et al. |
| 9,327,734 B2 | 5/2016 | Lombrozo et al. |
| 2005/0012604 A1 | 1/2005 | Takahashi |
| 2005/0137756 A1 | 6/2005 | Takahashi |
| 2007/0124072 A1 | 5/2007 | Nakayama et al. |
| 2008/0162027 A1 | 7/2008 | Murphy et al. |
| 2008/0189040 A1 | 8/2008 | Nasu et al. |
| 2009/0118909 A1 | 5/2009 | Rebut et al. |
| 2009/0174573 A1 | 7/2009 | Smith |
| 2010/0004856 A1 | 1/2010 | Kobori et al. |
| 2010/0106356 A1 | 4/2010 | Trepagnier et al. |
| 2010/0174440 A1 | 7/2010 | Franchineau et al. |
| 2011/0182475 A1 | 7/2011 | Fairfield et al. |
| 2011/0270476 A1 | 11/2011 | Doppler et al. |
| 2012/0059789 A1 | 3/2012 | Sakai et al. |
| 2012/0179358 A1 | 7/2012 | Chang et al. |

FOREIGN PATENT DOCUMENTS

| | | |
|---|---|---|
| DE | 102010002300 | 8/2011 |
| DE | 102011004425 | 8/2012 |
| DE | 102012213815 | 2/2013 |
| EP | 1845003 | 10/2007 |
| EP | 2096612 | 9/2009 |
| EP | 2495713 | 9/2012 |
| JP | H03012799 | 1/1991 |
| JP | H10129438 | 5/1998 |
| JP | 2004078334 | 3/2004 |
| JP | 2005032063 | 2/2005 |
| JP | 2005202922 | 7/2005 |
| JP | 2008158969 | 7/2008 |
| JP | 20010228740 | 10/2010 |
| JP | 2010267211 | 11/2010 |
| JP | 2011527556 | 10/2011 |
| KR | 1020100034281 | 4/2010 |
| KR | 20120026845 | 3/2012 |
| WO | 2009/155228 | 12/2009 |
| WO | 2011/052247 | 5/2011 |

OTHER PUBLICATIONS

European Patent Office, Supplementary European Search Report dated May 31, 2016, issued in connection with European Patent Application No. 13797850, 13 pages.

International Searching Authority, International Search Report and Written Opinion dated Jun. 14, 2013, issued in connection with International Patent Application No. PCT/US2013/030120, filed on Mar. 11, 2013, 10 pages.

Sukthankar, Rahul, "RACCOON: A Real-time Autonomous Car Chaser Operating Optimally At Night," Intelligent Vehicles '93 Symposium, Tokyo, Japan, Jul. 14-16, 1993, IEEE, pp. 37-42.

Back View

INFERRING STATE OF TRAFFIC SIGNAL AND OTHER ASPECTS OF A VEHICLE'S ENVIRONMENT BASED ON SURROGATE DATA

CROSS-REFERENCE TO RELATED APPLICATIONS

This application is a continuation of application Ser. No. 14/308,409, filed Jun. 18, 2014, which is a continuation of application Ser. No. 13/486,886, filed Jun. 1, 2012. The prior applications are incorporated herein by reference.

BACKGROUND

Unless otherwise indicated herein, the materials described in this section are not prior art to the claims in this application and are not admitted to be prior art by inclusion in this section.

Some vehicles are configured to operate in an autonomous mode in which the vehicle navigates through an environment with little or no input from a driver. Such a vehicle typically includes one or more sensors that are configured to sense information about the environment. The vehicle may use the sensed information to navigate through the environment. For example, if the sensors sense that the vehicle is approaching an obstacle, the vehicle may navigate around the obstacle.

SUMMARY

In a first aspect, a method is provided. The method includes obtaining sensor data from one or more sensors observing one or more aspects of an environment of a vehicle. The one or more sensors are operationally associated with the vehicle. The vehicle is configured to operate in an autonomous mode. The method further includes using an inference system to infer, based on the sensor data, at least one aspect of the environment of the vehicle that is not observed by the one or more sensors. The method also includes controlling the vehicle in the autonomous mode based on the at least one inferred aspect of the environment of the vehicle.

In a second aspect, a vehicle is provided. The vehicle includes one or more sensors, an inference system, and a control system. The one or more sensors are configured to acquire sensor data. The sensor data relates to one or more aspects of an environment of a vehicle observed by the one or more sensors. The vehicle is configured to operate in an autonomous mode. The inference system is configured to infer, based on the sensor data, at least one aspect of the environment of the vehicle that is not observed by the one or more sensors. The control system is configured to control the vehicle in the autonomous mode based on the at least one inferred aspect of the environment of the vehicle.

In a third aspect, a non-transitory computer readable medium having stored instructions is provided. The instructions are executable by a computer system to cause the computer system to perform functions. The functions include obtaining sensor data from one or more sensors observing one or more aspects of an environment of a vehicle. The one or more sensors are operationally associated with the vehicle. The vehicle is configured to operate in an autonomous mode. The functions further include inferring, based on the sensor data, at least one aspect of the environment of the vehicle that is not observed by the one or more sensors. The functions also include controlling the vehicle in the autonomous mode based on the at least one inferred aspect of the environment of the vehicle.

In a fourth aspect, a method is provided. The method includes obtaining sensor data from one or more sensors observing at least one light source in an environment of the vehicle. The one or more sensors are operationally associated with the vehicle and a state of a controlling traffic signal is not directly observable using the one or more sensors. The vehicle is configured to operate in an autonomous mode. The method further includes using an inference system to infer, based on the sensor data, an inferred state of the controlling traffic signal. The method also includes controlling the vehicle in the autonomous mode based on the inferred state of the controlling traffic signal.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
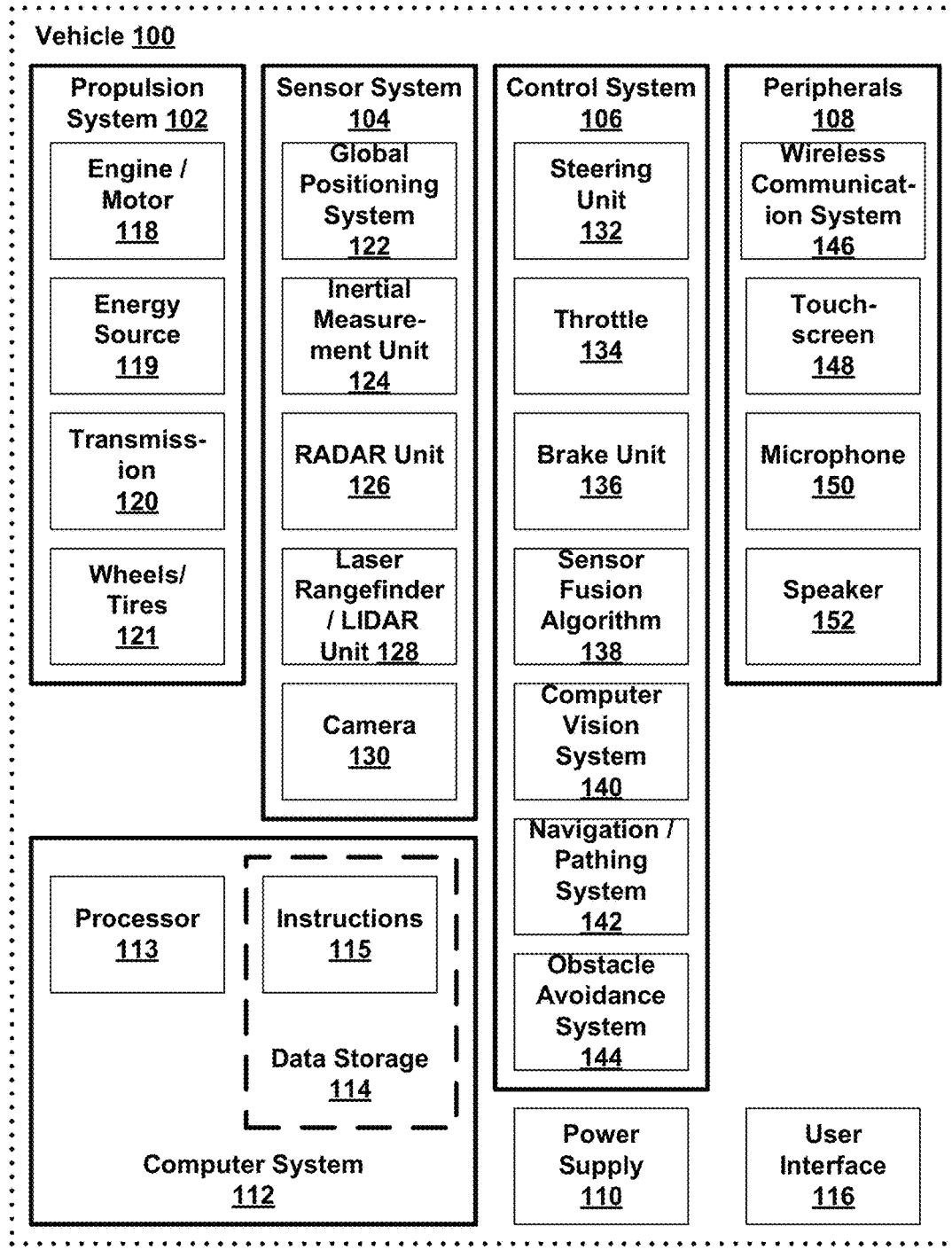
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments disclosed herein relate to obtaining sensor data from one or more sensors observing one or more aspects of an environment of a vehicle, using an inference system to infer, based on the sensor data, at least one aspect of the environment of the vehicle that is not observed by the one or more sensors, and controlling the vehicle based on the at least one inferred aspect of the environment of the vehicle.

Within the context of the disclosure, the vehicle could be operable in various modes of operation. In some embodiments, such modes of operation could include manual, semi-autonomous, and autonomous modes. In the autonomous mode, the vehicle could be driven with little or no user interaction. In the manual and semi-autonomous modes, the vehicle could be driven entirely and partially, respectively, by a user.

Some methods disclosed herein could be carried out in part or in full by a vehicle configured to operate in an autonomous mode with or without external interaction (e.g., such as from a user of the vehicle). In one such example, a vehicle could obtain sensor data from one or more sensors operationally associated with the vehicle. The sensors could be located on-board the vehicle or the sensors could be elsewhere. An inference system, which could be located fully or partially on-board the vehicle, may be used to infer, based on the sensor data, at least one aspect of the environment of the vehicle that is not observed by the one or more sensors. In an example embodiment, the at least one aspect of the environment of the vehicle that is not observed by the one or more sensors could be related to traffic flow (e.g., an unobservable accident ahead) and/or traffic regulation (e.g., state of an unobservable traffic light, order of vehicles proceeding at a four-way stop, etc.). Other aspects of the environment of the vehicles that are not observed by the one or more sensors are possible. The inference system could include, for example, a computer system (e.g., a processor and a memory). The vehicle could be controlled based on the at least one inferred aspect of the environment of the vehicle.

Other methods disclosed herein could be carried out in part or in full by a server. In example embodiment, a server may receive sensor data from one or more sensors observing one or more aspects of an environment of a vehicle. In some embodiments, the sensor data could be transmitted to the server using a wireless communication system. The server may include an inference system. The inference system could be used to infer, based on the sensor data, at least one aspect of the environment of the vehicle that is not observed by the one or more sensors. In an example embodiment, the server could include a data store of predetermined scenarios. If the sensor data substantially matches at least one of the predetermined scenarios, the inference system could infer the at least one aspect of the environment of the vehicle that is not observed by the one or more sensors. Other interactions between a vehicle operating in an autonomous mode and a server are possible within the context of the disclosure.

A vehicle is also described in the present disclosure. The vehicle may include elements such as one or more sensors, an inference system, and a control system. The one or more sensors are configured to acquire sensor data. The sensor data relates to one or more aspects of an environment of a vehicle observed by the one or more sensors.

The one or more sensors could include one of, or a combination of, a camera, a RADAR system, a LIDAR system, an acoustic sensor, a rangefinder, or another type of sensor.

The inference system could be configured to infer, based on the sensor data, at least one aspect of the environment of the vehicle that is not observed by the one or more sensors. The inference system could be configured to use one or more algorithms in order to determine the inference. The algorithms could include, for example, one or more of a Bayesian network, a hidden Markov model, and a decision tree. Other types of inference systems are possible within the context of this disclosure.

The control system could be configured to control the vehicle in the autonomous mode based on the at least one inferred aspect of the environment of the vehicle. The control system could be operable to control the vehicle to speed up, slow down, adjust heading, reroute, and take evasive action, among many other possibilities.

In some embodiments, the inference system and the control system could be provided by a computer system in the vehicle. In other embodiments, the inference system and/or the control system could be provided by one or more servers or other computer systems external to the vehicle.

Also disclosed herein are non-transitory computer readable media with stored instructions. The instructions could be executable by a computing device to cause the computing device to perform functions similar to those described in the aforementioned methods.

There are many different specific methods and systems that could be used in obtaining sensor data from one or more sensors observing one or more aspects of an environment of a vehicle. An inference system could be used to infer, based on the sensor data, at least one aspect of the environment of the vehicle that is not observed by the one or more sensors. The vehicle could be controlled based on the at least one inferred aspect of the environment of the vehicle. Each of these specific methods and systems are contemplated herein, and several example embodiments are described below.

2. Example Systems

Example systems within the scope of the present disclosure will now be described in greater detail. Generally, an example system may be implemented in or may take the form of a vehicle. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. For example, the vehicle 100 could control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 100 based on the determined information. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. In an example embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. That is, the engine/motor 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are operable to transmit mechanical power from the engine/motor 118 to the wheels/tires 121. To this end, the transmission 120 could include a gearbox, clutch, differential, and drive shafts. The transmission 120 could include other elements. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber, or another combination of materials.

The sensor system 104 may include a number of sensors configured to sense information about an environment of the vehicle 100. For example, the sensor system 104 could include a Global Positioning System (GPS) 122, an inertial measurement unit (IMU) 124, a RADAR unit 126, a laser rangefinder/LIDAR unit 128, and a camera 130. The sensor system 104 could also include sensors configured to monitor internal systems of the vehicle 100 (e.g., $O_2$ monitor, fuel gauge, engine oil temperature). Other sensors are possible as well.

One or more of the sensors included in sensor system 104 could be configured to be actuated separately and/or collectively in order to modify a position and/or an orientation of the one or more sensors.

The GPS 122 may be any sensor configured to estimate a geographic location of the vehicle 100. To this end, GPS 122 could include a transceiver operable to provide information regarding the position of the vehicle 100 with respect to the Earth.

The IMU 124 could include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. In an example embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 could include one or more devices configured to capture a plurality of images of the environment of the vehicle 100. The camera 130 could be a still camera or a video camera.

The control system 106 may be configured to control operation of the vehicle 100 and its components. Accordingly, the control system 106 could include various elements include steering unit 132, throttle 134, brake unit 136, a sensor fusion algorithm 138, a computer vision system 140, a navigation/pathing system 142, and an obstacle avoidance system 144.

The steering unit 132 could represent any combination of mechanisms that may be operable to adjust the heading of vehicle 100.

The throttle 134 could be configured to control, for instance, the operating speed of the engine/motor 118 and, in turn, control the speed of the vehicle 100.

The brake unit 136 could include any combination of mechanisms configured to decelerate the vehicle 100. The brake unit 136 could use friction to slow the wheels/tires 121. In other embodiments, the brake unit 136 could convert the kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 could include, for instance, a Kalman filter, Bayesian network, or other algorithm. The sensor fusion algorithm 138 could further provide various assessments based on the data from sensor system 104. In an example embodiment, the assessments could include evaluations of individual objects and/or features in the environment of vehicle 100, evaluation of a particular situation, and/or evaluate possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, and obstacles. The computer vision system 140 could use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 could represent a control system configured to identify, evaluate, and avoid or otherwise negotiate potential obstacles in the environment of the vehicle 100.

The control system 106 may additionally or alternatively include components other than those shown and described.

Peripherals 108 may be configured to allow interaction between the vehicle 100 and external sensors, other vehicles, other computer systems, and/or a user. For example, peripherals 108 could include a wireless communication system 146, a touchscreen 148, a microphone 150, and/or a speaker 152.

In an example embodiment, the peripherals 108 could provide, for instance, means for a user of the vehicle 100 to interact with the user interface 116. To this end, the touchscreen 148 could provide information to a user of vehicle 100. The user interface 116 could also be operable to accept input from the user via the touchscreen 148. The touchscreen 148 may be configured to sense at least one of a position and a movement of a user's finger via capacitive sensing, resistance sensing, or a surface acoustic wave process, among other possibilities. The touchscreen 148 may be capable of sensing finger movement in a direction parallel or planar to the touchscreen surface, in a direction normal to the touchscreen surface, or both, and may also be capable of sensing a level of pressure applied to the touchscreen surface. The touchscreen 148 may be formed of one or more translucent or transparent insulating layers and one or more translucent or transparent conducting layers. The touchscreen 148 may take other forms as well.

In other instances, the peripherals 108 may provide means for the vehicle 100 to communicate with devices within its environment. The microphone 150 may be configured to receive audio (e.g., a voice command or other audio input) from a user of the vehicle 100. Similarly, the speakers 152 may be configured to output audio to the user of the vehicle 100.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In some embodiments, one or more banks of such batteries could be configured to provide electrical power. Other power supply materials and configurations are possible. In some embodiments, the power supply 110 and energy source 119 could be implemented together, as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the control system 106 in order to control the steering unit 132 to avoid an obstacle detected by the sensor system 104 and the obstacle avoidance system 144. In an example embodiment, the computer system 112 could be operable to provide control over many aspects of the vehicle 100 and its subsystems.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
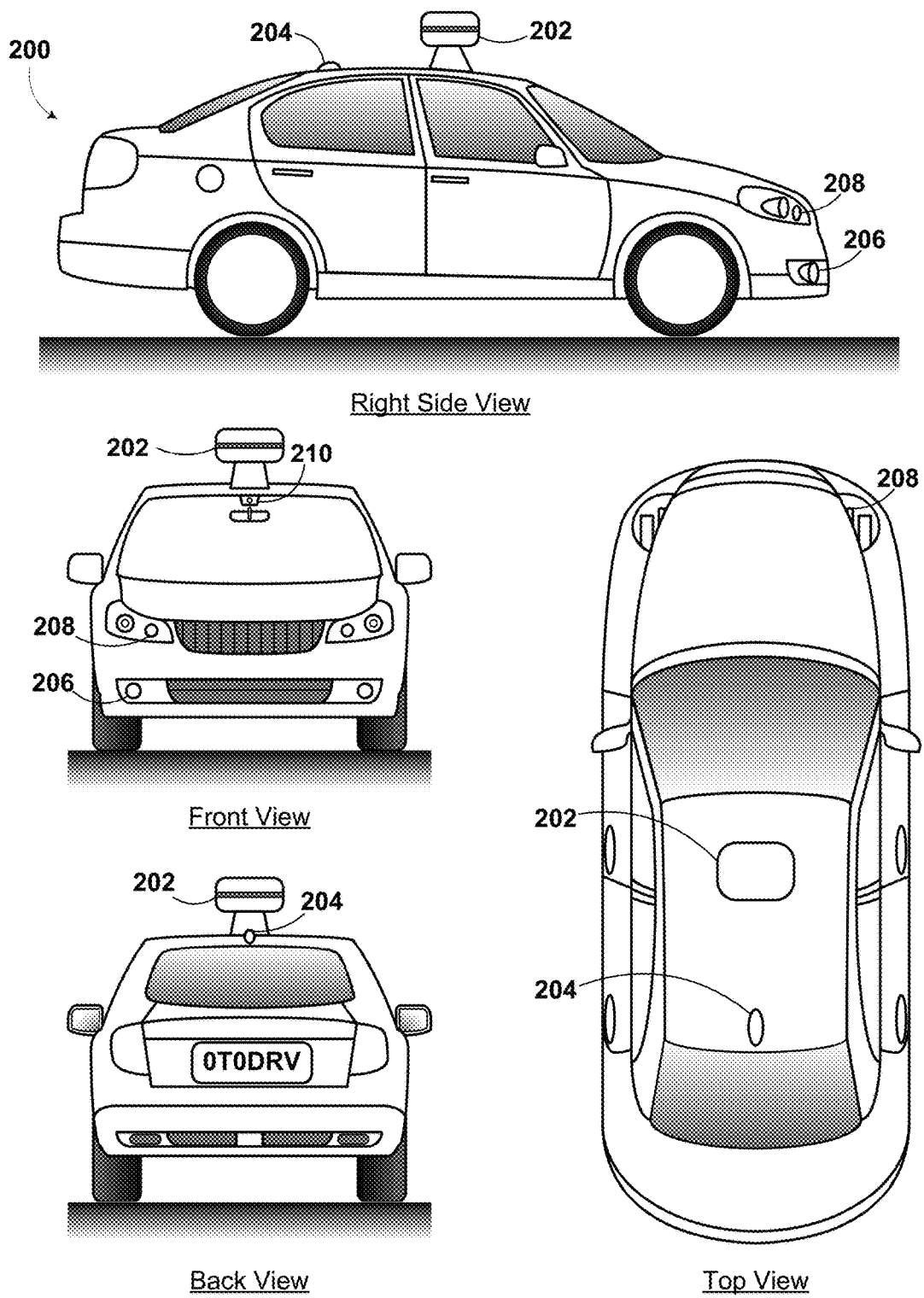
FIG. 2 shows a vehicle, according to an example embodiment.

FIG. 2 shows a vehicle 200 that could be similar or identical to vehicle 100 described in reference to FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

In some embodiments, vehicle 200 could include a sensor unit 202, a wireless communication system 204, a LIDAR unit 206, a laser rangefinder unit 208, and a camera 210. The elements of vehicle 200 could include some or all of the elements described for FIG. 1.

The sensor unit 202 could include one or more different sensors configured to capture information about an environment of the vehicle 200. For example, sensor unit 202 could include any combination of cameras, RADARs, LIDARs, range finders, and acoustic sensors. Other types of sensors are possible. In an example embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include LIDAR unit 206 and laser rangefinder unit 208. Furthermore, each sensor of sensor unit 202 could be configured to be moved or scanned independently of other sensors of sensor unit 202.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be any camera (e.g., a still camera, a video camera, etc.) configured to capture a plurality of images of the environment of the vehicle 200. To this end, the camera 210 may be configured to detect visible light, or may be configured to detect light from other portions of the spectrum, such as infrared or ultraviolet light. Other types of cameras are possible as well.

The camera 210 may be a two-dimensional detector, or may have a three-dimensional spatial range. In some embodiments, the camera 210 may be, for example, a range detector configured to generate a two-dimensional image indicating a distance from the camera 210 to a number of points in the environment. To this end, the camera 210 may use one or more range detecting techniques. For example, the camera 210 may use a structured light technique in which the vehicle 200 illuminates an object in the environment with a predetermined light pattern, such as a grid or checkerboard pattern and uses the camera 210 to detect a reflection of the predetermined light pattern off the object. Based on distortions in the reflected light pattern, the vehicle 200 may determine the distance to the points on the object.

The predetermined light pattern may comprise infrared light, or light of another wavelength. As another example, the camera 210 may use a laser scanning technique in which the vehicle 200 emits a laser and scans across a number of points on an object in the environment. While scanning the object, the vehicle 200 uses the camera 210 to detect a reflection of the laser off the object for each point. Based on a length of time it takes the laser to reflect off the object at each point, the vehicle 200 may determine the distance to the points on the object. As yet another example, the camera 210 may use a time-of-flight technique in which the vehicle 200 emits a light pulse and uses the camera 210 to detect a reflection of the light pulse off an object at a number of points on the object. In particular, the camera 210 may include a number of pixels, and each pixel may detect the reflection of the light pulse from a point on the object. Based on a length of time it takes the light pulse to reflect off the object at each point, the vehicle 200 may determine the distance to the points on the object. The light pulse may be a laser pulse. Other range detecting techniques are possible as well, including stereo triangulation, sheet-of-light triangulation, interferometry, and coded aperture techniques, among others. The camera 210 may take other forms as well.

The camera 210 could be mounted inside a front windshield of the vehicle 200. Specifically, as illustrated, the camera 210 could capture images from a forward-looking view with respect to the vehicle 200. Other mounting locations and viewing angles of camera 210 are possible, either inside or outside the vehicle 200.

The camera 210 could have associated optics that could be operable to provide an adjustable field of view. Further, the camera 210 could be mounted to vehicle 200 with a movable mount that could be operable to vary a pointing angle of the camera 210.

Within the context of the present disclosure, the components of vehicle 100 and/or vehicle 200 could be configured to work in an interconnected fashion with other components within or outside their respective systems. For instance, in an example embodiment, the camera 130 could capture a plurality of images that could represent sensor data relating to an environment of the vehicle 100 operating in an autonomous mode. The environment could include another vehicle blocking a known traffic signal location ahead of the vehicle 100. Based on the plurality of images, an inference system (which could include the computer system 112, sensor system 104, and control system 106) could infer that the unobservable traffic signal is red based on sensor data from other aspects of the environment (for instance images indicating the blocking vehicle's brake lights are on). Based on the inference, the computer system 112 and propulsion system 102 could act to control the vehicle 100. More detailed example implementations will be discussed below.

3. Example Implementations

Several example implementations will now be described herein. It will be understood that there are many ways to implement the devices, systems, and methods disclosed herein. Accordingly, the following examples are not intended to limit the scope of the present disclosure.

Figure 3A:
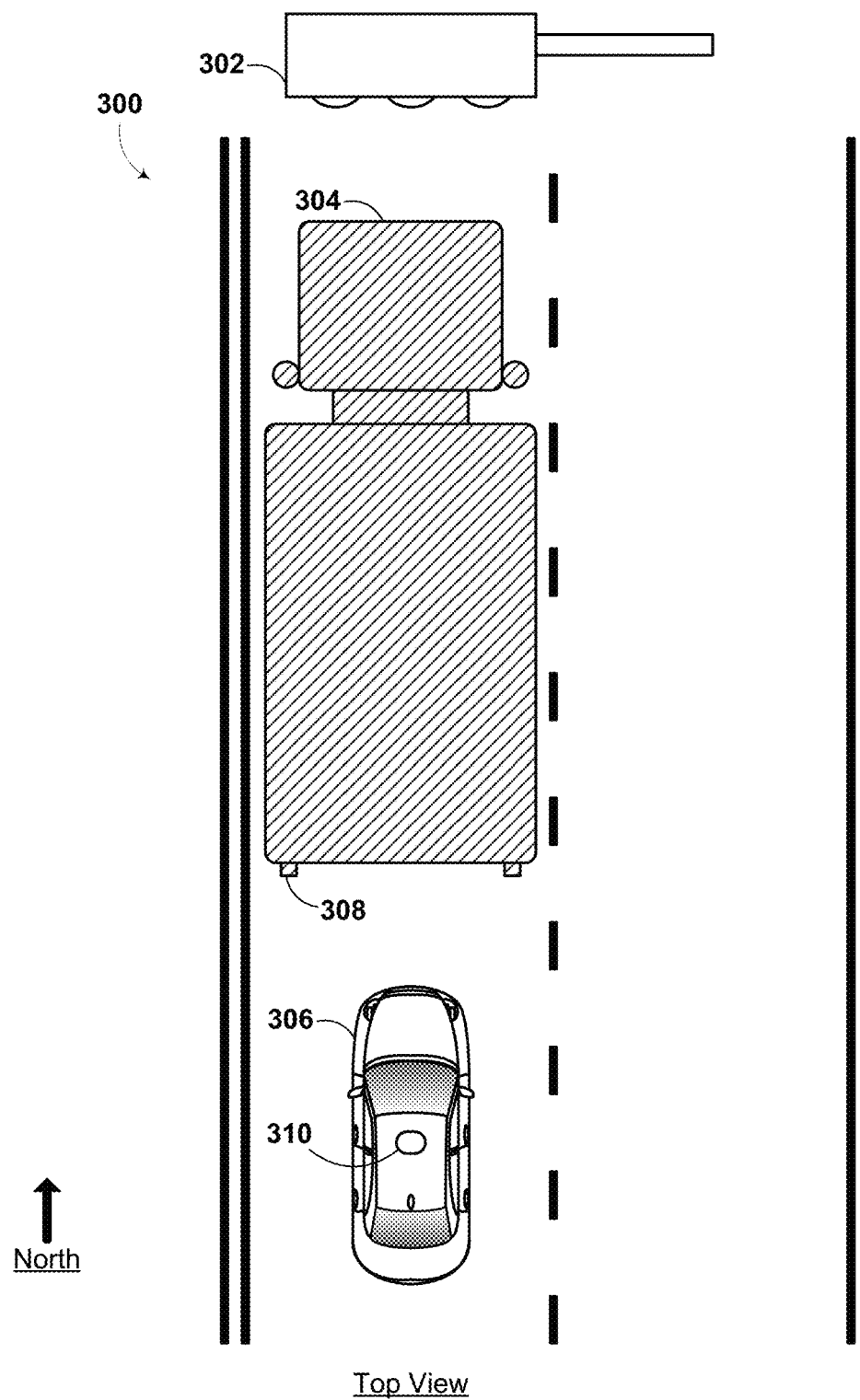
FIG. 3A is a top view of an autonomous vehicle operating scenario, according to an example embodiment.
Figure 3B:
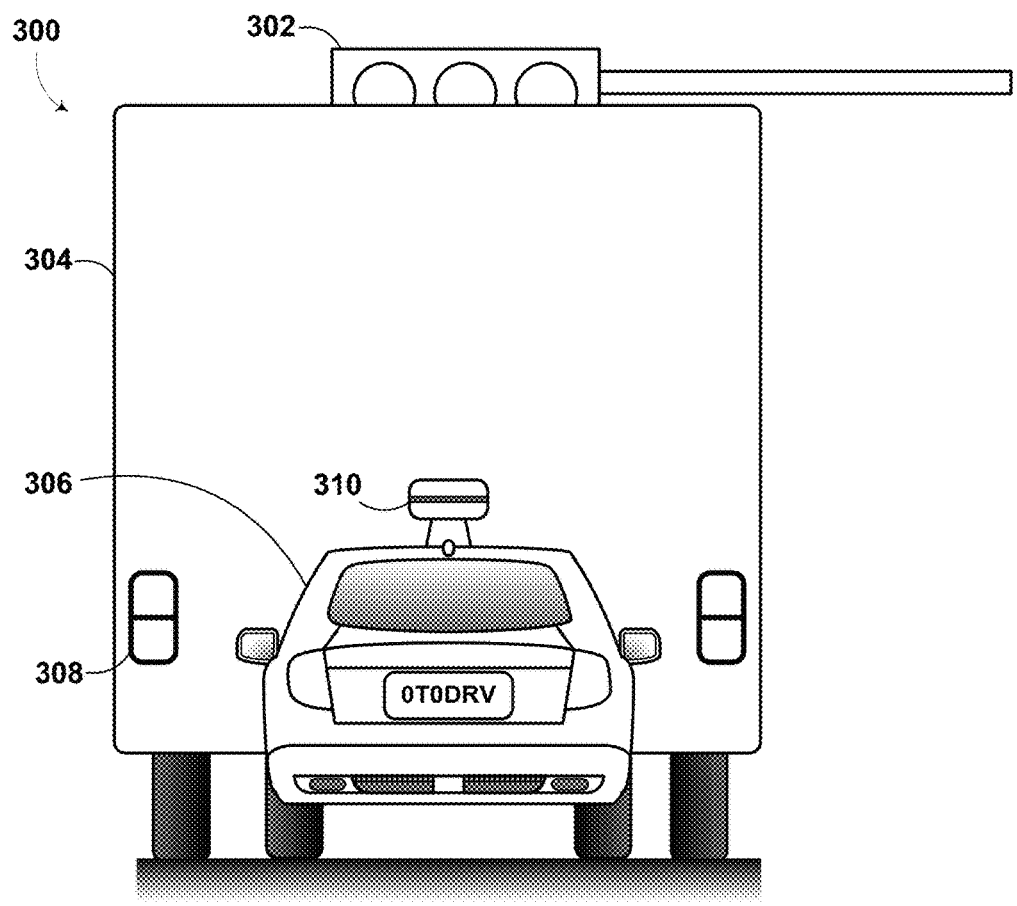
FIG. 3B is a rear view of the autonomous vehicle operating scenario of FIG. 3A, according to an example embodiment.

FIG. 3A and FIG. 3B illustrate a top view and a back view, respectively, of an autonomous vehicle operating scenario 300. In scenario 300, a vehicle 306, which may be operating in an autonomous mode, is stopped behind a large truck 304. The vehicle 306 could be similar or identical to the vehicle 100 and vehicle 200 as described in reference to FIG. 1 and FIG. 2. The vehicle 306 could include a sensor system 310. The large truck 304 could be obscuring a traffic signal 302 such that the sensor system 310 may not be able to directly sense the state of the traffic signal 302. In other words, in scenario 300, none of the sensors in sensor system 310 may be able to observe, image, transduce or otherwise detect the state of the traffic signal 302 due to the presence of large truck 304.

In such a case, sensor system 310 could be operable to obtain sensor data regarding other aspects of an environment of vehicle 306 in an effort to determine the state of the traffic signal 302 or any other relevant unobservable aspect of its environment. In an example embodiment, a camera associated with sensor system 310 could capture a plurality of images. The plurality of images could include information about one or more brake lights 308 of the large truck 304. The plurality of images could be an input to an inference system.

The inference system could determine from the images that the one or more brake lights 308 of the large truck 304 are lit. The inference system could also include other sensor data that may confirm that the large truck 304 is stopped. For instance, the inference system could obtain information about the environment of the vehicle 306 from RADAR and/or LIDAR sensor systems.

The inference system could compare the sensor data to a set of predetermined scenarios in an effort to match the present sensor data with a particular predetermined scenario. The predetermined scenarios could be saved in data storage on-board the vehicle. Alternatively, the predetermined scenarios could be stored elsewhere, such as in a server network.

If a substantial match exists between a particular predetermined scenario and the present sensor data, an inference could be made regarding a possible state of the unseen traffic signal 302. For instance, in scenario 300, the inference could be that the state of traffic signal 302 is "red" (because large truck 304 is stopped due to obeying the traffic signal 302).

Within the context of the disclosure, a substantial match could be made based on any one of, or a combination of, a similar arrangement of stopped vehicles, a similar roadway, a similar location/intersection, a similar route, a similar time of day, or any other similar aspect of the environment of vehicle 306.

Inferences could be made by the inference system based on other algorithms. For instance, the inference could be made based on a Bayesian network, a hidden Markov model, and/or a decision tree. Other algorithms could be used individually or in combination in order to infer about an aspect of the environment.

Based on the inferred aspect of the environment of the vehicle 306, the vehicle 306 may be controlled to perform actions. In scenario 300, the action could constitute staying stopped until the large truck 304 begins to move again.

In some scenarios, one or more subsequent inferences could be made by the inference system if conditions in the environment change, or if conditions in the environment stay the same. For example, in scenario 300, if the vehicle 306 stays stopped behind the large truck 304 for longer than an expected traffic signal delay time, the vehicle 306 could make a subsequent inference that the large truck 304 is stopped due to a break down and not obeying the traffic signal 302. In response to the subsequent inference, the vehicle 306 may take action, for instance, to move into an adjacent lane so as to move around the large truck 304. Subsequent inferences could be made on an on-going basis, at specific predetermined intervals, or upon sensing specific triggering events, such as scenario-specific sensor data. Other subsequent inferences may be possible within the context of this disclosure.

Figure 3C:
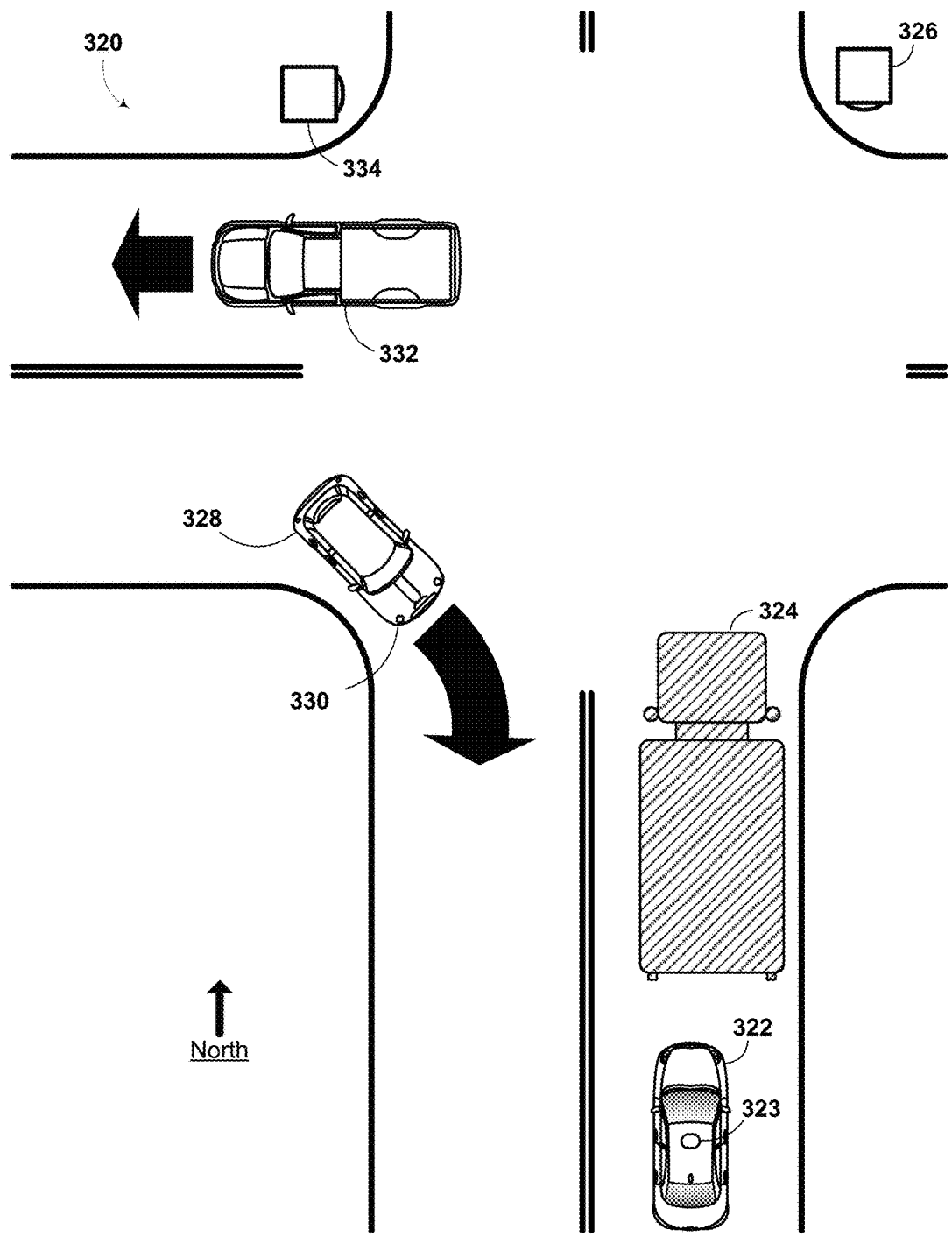
FIG. 3C is a top view of an autonomous vehicle operating scenario, according to an example embodiment.

FIG. 3C illustrates a top view of an autonomous vehicle operating scenario 320. Similar to scenario 300, a large truck 324 may be blocking a view of a north-bound traffic signal 326 for vehicle 322, which may be operating in an autonomous mode. As such, sensor system 323 of vehicle 322 may be impeded from directly observing or otherwise sensing the state of the north-bound traffic signal 326. The vehicle 322 could be similar or identical to the vehicle 100 and vehicle 200 as described in reference to FIG. 1 and FIG. 2.

In an effort to infer the state of the north-bound traffic signal 326, the vehicle 322 could use sensor data from observable aspects of the environment. For instance, sensor system 323 could use one or a combination of its associated sensors (e.g., a camera, a RADAR, a LIDAR, an acoustic sensor, an ultrasonic sensor, etc.) to observe other traffic or non-traffic indicators that could be used as inputs to the inference system.

In scenario 320, one or more sensors associated with sensor system 323 could observe car 328 turning right onto a south-bound roadway and truck 332 proceeding on a west-bound roadway. The sensor data related to actions of the car 328 and the truck 332 could be used as an input to the inference system. Based on the sensor data, the inference system could infer that the state of the traffic signal 326 is "red" for north- and south-bound traffic, and the state of the traffic signal 334 is "green" for east- and west-bound traffic. As described above, the inference system could compare the sensor data and other data to a set of predetermined scenarios. If a substantial match exists between the sensor data/other data and a specific predetermined scenario, an inference could be made based on the most likely outcome within the context of the specific predetermined scenario.

Based on the inference, for instance that the north-bound traffic signal 326 is "red", the vehicle 322 could be controlled to take action in the form of remaining stopped behind large truck 324.

Figure 3D:
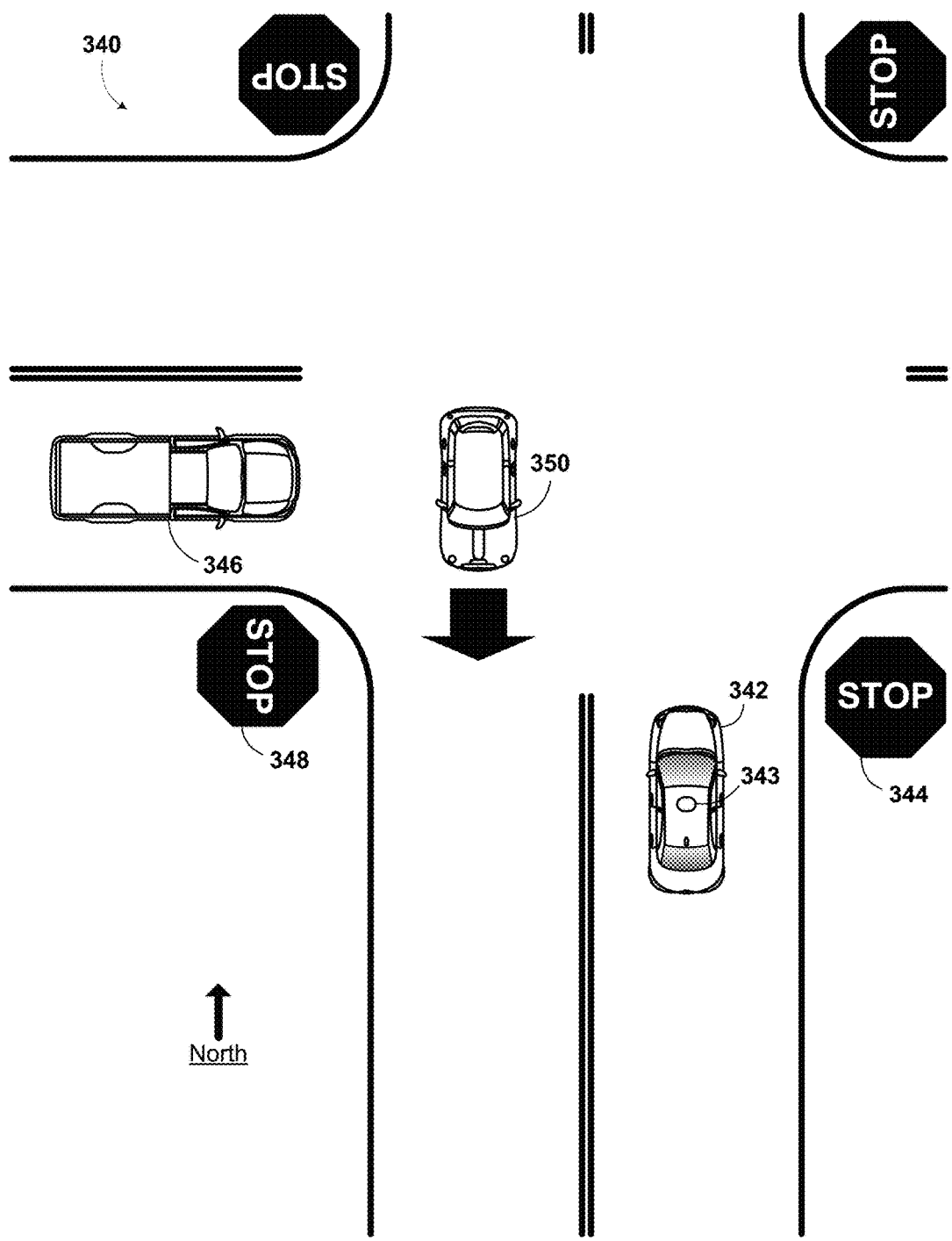
FIG. 3D is a top view of an autonomous vehicle operating scenario, according to an example embodiment.

FIG. 3D illustrates a top view of an autonomous vehicle operating scenario 340. In scenario 340, a vehicle 342 could be stopped at a four-way stop intersection, obeying north-bound stop sign 344. The vehicle 342 could be operating in an autonomous mode. The vehicle 342 could be similar or identical to the vehicle 100 and vehicle 200 as described in reference to FIG. 1 and FIG. 2. Truck 346 may also be stopped at the intersection due to east-bound stop sign 348. In such a scenario, the vehicle 342 may want to determine a state of a traffic progression of the four-way stop intersection. However, such a state of traffic progression may not be observable. In other words, the vehicle 342 may be uncertain about which vehicle should progress through the intersection next and there may be no directly observable signal (e.g., a traffic signal) to indicate the progression order.

Sensor system 343 may be operable to sense other observable parts of the environment of vehicle 343 that could provide information about the state of the traffic progression in the four-way stop intersection. For example, the sensor system 343 could use one or more associated sensors to observe car 350 moving south-bound through the intersection. The sensor data could be obtained by the inference system.

Based on the sensor data, the inference system could infer about the state of the traffic progression in the four-way stop intersection. In this case, the inference system could determine that it is too late to progress north-bound through the intersection and infer that the truck 346 should move forward through the intersection next.

Based on the inference, the vehicle 342 could be controlled to wait for truck 346 to clear the intersection before proceeding through the intersection.

4. Example Methods

Figure 4A:
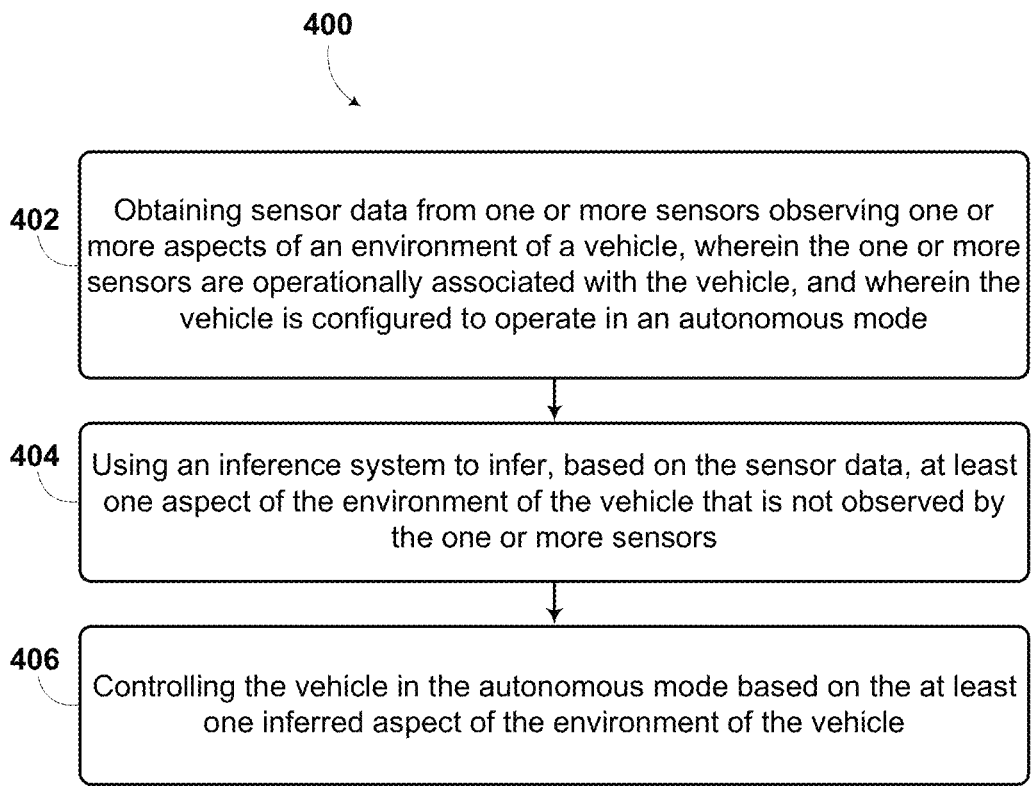
FIG. 4A shows a method, according to an example embodiment.

A method 400 is provided for obtaining sensor data from one or more sensors observing one or more aspects of an environment of a vehicle. The one or more sensors are operationally associated with the vehicle. The method further includes using an inference system to infer, based on the sensor data, at least one aspect of the environment of the vehicle that is not observed by the one or more sensors and controlling the vehicle based on the at least one inferred aspect of the environment of the vehicle. The method could be performed using any of the apparatus shown in FIGS. 1 and 2 and described above, however, other configurations could be used. FIG. 4A illustrates the steps in an example method, however, it is understood that in other embodiments, the steps may appear in different order and steps could be added or subtracted.

Step 402 includes obtaining sensor data from one or more sensors observing one or more aspects of an environment of a vehicle. The one or more sensors are operationally associated with the vehicle. The vehicle is configured to operate in an autonomous mode. The vehicle described in this method could be the vehicle 100 and/or vehicle 200 as illustrated and described in reference to FIGS. 1 and 2, respectively.

Obtaining sensor data could include using one or more of a camera, a radar system, a lidar system, and an acoustic-sensing system. Other sensors and sensor systems are possible in the context of the disclosure. The sensor data could be received by wired and/or wireless signals from the aforementioned sensors. In some embodiments, the sensor data could be obtained by a server network and communicated to the vehicle. Alternatively or additionally, the sensor data could be obtained by a computer system incorporated in the vehicle.

Step 404 includes using an inference system to infer, based on the sensor data, at least one aspect of the environment of the vehicle that is not observed by the one or more sensors. The inference system could be provided by the computer system 112 as shown and described in reference to FIG. 1. In other embodiments, the inference system could be partially or wholly provided by one or more computer systems external to the vehicle, such as in a server network.

The inference system could be operable to make inferences about any number of aspects of the environment of the vehicle not directly observed by the one or more sensors associated with the vehicle. For instance, the inference system could make an inference about a state of an unseen traffic signal or four-way stop. In other embodiments, the inference system could make an inference about a traffic density on a roadway, a speed limit, a road condition, a behavior of another vehicle, a road route, and/or an accident or obstacle impeding a roadway. Other aspects of the environment could be inferred.

The inference system could make inferences based on sensor data from one of, or any combination of, sensors operationally-associated with the vehicle. The sensors could be located on-board the vehicle. Alternatively, some of the sensors could be located apart from the vehicle.

The inferences made by the inference system could be based on any aspect of the environment of the vehicle observable to the sensors. In an example embodiment, inferences could be made from sensor data regarding the other vehicles. The sensor data could relate to, for instance, the speed, heading, and/or position of other vehicles. For example, inferences could be made based on the acceleration and/or deceleration (with or without brake lights) of other vehicles when approaching an intersection with an occluded traffic signal. Deceleration of the other vehicles may imply a 'red' traffic signal, while acceleration may imply a 'green' traffic signal. Other examples are possible with regards to using sensor data based on other vehicles.

Inferences could also be made based on the sensed position of obstacles, changes in the observed roadway compared to a known map, condition of the roadway, etc. Further, sensor data from more than one sensor could be used by the inference system to make an inference.

The inference system could include artificial intelligence and/or a learning algorithm. In such cases, the inference system could infer about an aspect of the environment of the vehicle based on obtained sensor data. The sensor data could be compared against a set of representative sensor input scenarios or predetermined scenarios that could represent a set of similar scenarios with a set of possible outcomes. That is, for a given a set of sensor inputs, a set of possible outcomes could be associated to the given set of sensor inputs. Each possible outcome associated with the given set of sensor inputs could be associated with a probability. The probability could relate to the possible outcome actually occurring.

The inference made by the inference system could relate to a 'best guess' for the outcome, which may include one of the possible outcomes. If the inference is confirmed (e.g., the 'best guess' was correct), the possible outcome within the set of representative sensor input scenarios could be reinforced by, for instance, increasing the probability that the possible outcome will occur. If the inference is determined to be incorrect, the probability could be decreased for the given possible outcome among the set of representative sensor input scenarios or predetermined scenarios. Other types of learning algorithms are possible.

Each predetermined scenario or inference could include an associated confidence level based on how confident the inference system may be in the predicted outcome. The confidence level may or may not directly correlate with the respective probability of the most-likely outcome in each predetermined scenario. The confidence level could be based on, for instance, one or more actual outcomes following one or more previous inferences. In such an example, if a previous inference incorrectly predicted the actual outcome, the confidence level of the predetermined scenario could be subsequently decreased. Conversely, if a previous inference correctly predicted the actual outcome, the confidence level of the predetermined scenario could be increased.

Within the context of the disclosure, inferences could be made using a fail-safe approach. In other words, the inference system could make inferences that may be correct or incorrect representations of an unobservable aspect of the environment. In a fail-safe approach, incorrect inferences (e.g., inferring that a traffic light is "red" when it is actually "green") could be carried out within the context of safe vehicle operation so as to avoid unsafe operation.

For example, various traffic rules could be used or modified by the inference system in an effort to provide fail-safe operation. An actual traffic rule could be: 'Unless you know a traffic signal is green, do not proceed through the intersection.' The inference system could use a modified version of the rule such as: 'Unless you directly observe a traffic signal as being green or unless other vehicles in your lane are proceeding through the intersection, do not proceed through the intersection.' The inference system may also add additional limitations to various actions for safer operation. Such additional limitations could include redundant sensor data checks (so the vehicle does not move based on a sensor glitch), heterogeneous sensor checks (e.g., radar and optical sensor inputs should agree), additional wait times, etc. The additional limitations may be added to provide more reliable and safe operation of the vehicle while in the autonomous mode.

In some scenarios, the inference system could request vehicle driver/occupant input to confirm or reject an inference. For example, when approaching an intersection where the traffic signal is flashing red, the inference system could infer that the traffic signal is non-functional and may ask for input from an occupant of the vehicle. The inference system could ask, "This traffic light appears broken, can you please confirm?" The vehicle occupant could respond, "Yes, it looks broken," or "No, I think it normally flashes red." Such input from the vehicle occupant could be used alone or in combination with sensor data to make further inferences about the aspect of the environment and/or to control the vehicle. The interaction between the inference system and the vehicle occupant could be carried out using voice, text, or other forms of communication.

In another example embodiment, while approaching an intersection, a traffic signal could be occluded from the vehicle sensor system. The vehicle may come to a stop at the intersection. After waiting at least one cycle time of the traffic light and failing to receive other appropriate sensor data to proceed through the intersection, the inference system could ask the vehicle occupant "Is it safe to proceed through this intersection?" The vehicle occupant could respond with "Go" or "Don't Go". The vehicle could be controlled based on the response from the vehicle occupant. In other embodiments, the vehicle occupant could take manual control of the vehicle to negotiate the intersection. Other interactions between the inference system and the vehicle occupant are possible.

In some embodiments, inferences could be transmitted to one or more other vehicles configured to operate in an autonomous mode. For instance, an inference about a state of a traffic signal could be transmitted to vehicles behind the inferring vehicle as an 'early warning' to avoid abrupt braking or other emergency conditions.

Inferences could also be transmitted in the form of a query to nearby autonomous vehicles that may be operable to support or disprove the inference. For example, a vehicle stopped behind a large truck that could be blocking a traffic signal may infer that the large truck is stopped due to the state of the traffic signal being "red". In some embodiments, the vehicle may broadcast the inference in an effort to obtain further information about the state of the traffic signal. In response, other vehicles may respond with other information to support or disprove the inference.

Based on the inference made by the inference system, a control instruction or a set of control instructions could be generated by the inference system and transmitted or otherwise communicated to the vehicle or another computer system operable to control part or all of the functions of the vehicle.

Step 406 includes controlling the vehicle in the autonomous mode based on the at least one inferred aspect of the environment of the vehicle. Controlling the vehicle could represent the vehicle following the control instruction(s) in order to perform one or more of the vehicle accelerating, decelerating, changing heading, changing lane, shifting position within a lane, providing a warning notification (e.g., vehicle-to-vehicle communication message, horn signal, light signal, etc.), and changing to a different driving mode (e.g., semi-automatic or manual mode). Other actions involving controlling the vehicle are possible within the context of the present disclosure.

The vehicle could be controlled based at least partially on the confidence level of the inference or predetermined scenario.

The vehicle and any on-board computer systems could control the vehicle in the autonomous mode. Alternatively, computer systems, such as a server network, could be used to control some or all of the functions of the vehicle in the autonomous mode.

The methods and apparatus disclosed herein could be applied to a situation in which the vehicle operating in the autonomous mode approaches a freeway metering light (e.g., at a highway on-ramp). In the example situation, while the vehicle is stopped alongside the metering light, the field of view of the camera may not be sufficient to directly observe the metering light. The vehicle may receive information (e.g., from a highway administrator or other roadway information service) about the particular metering light. The received information could include whether metering is on at the particular metering light as well as the current metering interval. The information could be received via a wireless communication interface. As such, in situations where the vehicle may not be able to directly observe the metering light, there are several ways the vehicle could infer a proper interval time and/or a state of the metering light in order to proceed from the metering light.

For example, the vehicle may observe other cars and infer an interval time from movements of the other vehicles. In such an example, the vehicle could observe other vehicles advancing at a certain rate (e.g., approximately one every five seconds). Based on the observation of other vehicles, the vehicle may infer that the interval is approximately five seconds and proceed from the metering light after waiting the inferred interval time.

If the interval information is known (e.g., based on prior historical data or received information), the vehicle may infer the proper metering interval based on that interval information. For instance, the highway authority may provide metering interval information to the vehicle (e.g., the interval at the current metering light is seven seconds). Based on the interval information, the vehicle may infer the interval to be seven seconds and proceed from the metering light after waiting seven seconds after a previous vehicle departure. However, if the vehicle observes other vehicles are waiting much more time (or less time) than the interval information indicates, a new interval may be inferred based on real-time observations.

In a scenario that includes a two-lane metering light, the vehicle may observe other vehicles proceed from the metering light in an alternating fashion (e.g., right lane, left lane, right lane . . . ). Based on the departure interval, the vehicle could infer an appropriate time to wait at the metering light. Further, based on the departure interval and the present lane of the vehicle, the vehicle could infer the proper order in which to depart from the metering light.

In another example embodiment, the vehicle may make an inference about the state of the metering light based on previous observations of the metering light. For instance, as the vehicle is approaching the metering light, it may observe the state of the metering light. However, the view of the metering light may become occluded by another vehicle or the metering light may be outside the camera field of view. In such a situation, the vehicle may infer a current state of the metering light based on the previously observed state of the metering light. In particular, the vehicle may observe a transition of the metering light (e.g., red to green or green to red) while moving towards the metering light, which may then become unobservable. If the interval information is known to the vehicle, the vehicle could make an inference regarding the current state of the metering light based on the interval information and the elapsed time since the previously observed transition.

The vehicle may deliberately approach the metering light slowly when metering is on to assure that a whole metering cycle (or at least one metering light transition) is observed before the vehicle enters a location where the metering light is unobservable. Thus, the vehicle may be able to make a more confident inference about the current state of the metering light.

In yet another embodiment, the vehicle may approach an unobservable metering light with no other vehicles waiting at it or proceeding through it. If the vehicle has information that metering is on as well as information about the interval for the metering light, the vehicle may just wait at the metering light for the duration of the interval. Thus, despite not directly observing the metering light, the vehicle could make inferences about the metering light and control the vehicle in an effort to be safe and also to be in accordance with the spirit of traffic laws and regulations.

Figure 4B:
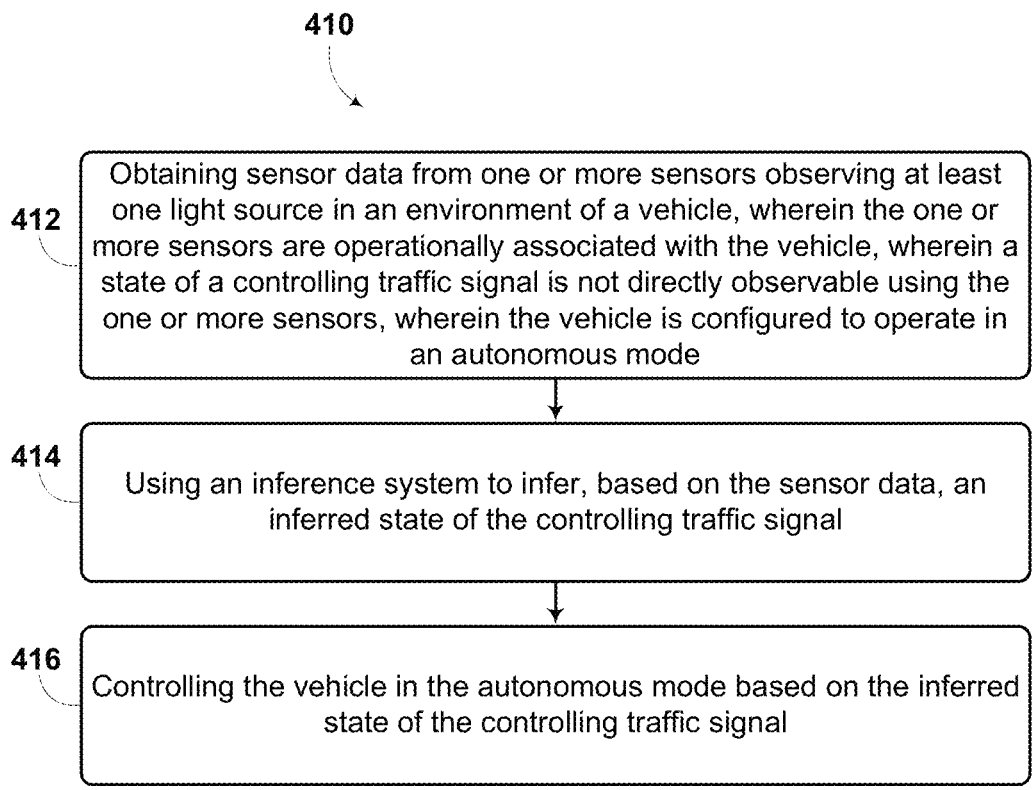
FIG. 4B shows a method, according to an example embodiment.

A method 410 is provided in which sensor data may be obtained from at least one sensor observing at least one light source in an environment of the vehicle when a state of a controlling traffic signal is not directly observable. Based on the sensor data, an inference system could infer an inferred state of the controlling traffic signal. The vehicle may be controlled based on the inferred state of the controlling traffic signal. The method could be performed using any of the apparatus shown in FIGS. 1 and 2 and described above, however, other configurations could be used. FIG. 4B illustrates the steps in an example method, however, it is understood that in other embodiments, the steps may appear in different order and steps could be added or subtracted.

Step 412 includes obtaining sensor data from one or more sensors observing at least one light source in an environment of a vehicle while a state of a controlling traffic signal is not directly observable using the one or more sensors. The vehicle could be configured to operate in an autonomous mode and the one or more sensors may be operationally associated with the vehicle.

The one or more sensors could include any type of sensor as described elsewhere in the present disclosure. The one or more sensors could be attached to the vehicle or could be located elsewhere.

The at least one light source could include one or more brake lights of another vehicle. Other light sources are possible.

The controlling traffic signal could represent any traffic-regulating device, such as a traffic light, a stop sign, or a metering light. For example, the vehicle could be approaching an intersection. In such a case, the controlling traffic signal could be a traffic light that regulates traffic flow through the intersection. Other types of controlling traffic signals are possible. In an example embodiment, the controlling traffic signal could be obstructed by another vehicle, a building, a tree, or any other type of obstruction such that the controlling traffic signal is not directly observable using the one or more sensors of the vehicle. In other embodiments, the controlling traffic signal could be outside the observable range of the one or more sensors of the vehicle.

Step 414 includes using an inference system to infer an inferred state of the controlling traffic signal based on the sensor data. In an example embodiment, the inference system could be a computer system associated with the vehicle, such as computer system 112 described in reference to FIG. 1. In other embodiments, the inference system could be associated in full or in part with another computer system (e.g., a server network).

As described elsewhere in the present disclosure, the inference system could be operable to make inferences based on sensor data. In some embodiments, the inference system could make inferences about an unobservable state of a controlling traffic signal. For example, a vehicle may be approaching an intersection with a controlling traffic signal. In such a case, a truck may prevent one or more sensors associated with the vehicle from directly observing a state of the controlling traffic signal. The vehicle could acquire sensor data related to one or more light sources in the environment of the vehicle, such as brake lights of other vehicles. If the brake lights of other vehicles are on, the inference system could infer that the state of the controlling traffic signal is red or 'stop'. If the brake lights of the other vehicles are not on, the inference system could infer that the state of the controlling traffic signal is green or 'go'. Other types of inferences are possible.

Step 416 includes controlling the vehicle in the autonomous mode based on the inferred state of the controlling traffic signal. In an example embodiment, if the inferred state of the controlling traffic signal is green or 'go', the vehicle could be controlled to 'go through intersection' or 'proceed with caution'. If the inferred state of the controlling traffic signal is red or 'stop', the vehicle could be controlled to stop. In some embodiments, the vehicle may be controlled to alert the driver and/or to enter a semiautomatic or manual mode. Other ways of controlling the vehicle in the autonomous mode based on the inferred state of the controlling traffic signal are possible.

Example methods, such as method 400 of FIG. 4A and method 410 of FIG. 4B, may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

Figure 5:
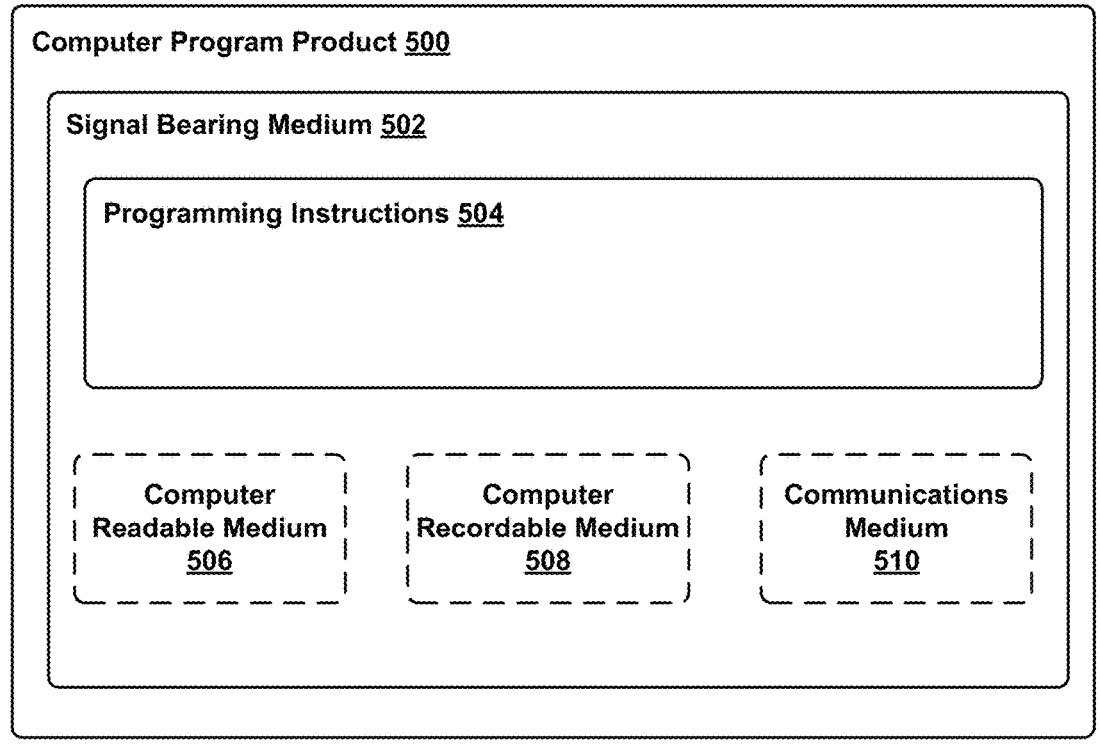
FIG. 5 is a schematic diagram of a computer program product, according to an example embodiment.

In some embodiments, the disclosed methods may be implemented as computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computer system, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 may encompass a computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method, comprising:
    obtaining sensor data from one or more sensors observing an environment of a vehicle, wherein the one or more sensors are operationally associated with the vehicle, wherein the vehicle is configured to operate in an autonomous mode, wherein the environment includes a traffic signal that is not observed by the one or more sensors, and wherein the sensor data indicates a status of at least one other vehicle in the environment;
    using an inference system to infer a state of the traffic signal based on the status of the at least one other vehicle in the environment; and
    controlling the vehicle in the autonomous mode based on the inferred state of the traffic signal.

2. The method of claim 1, wherein the status of the at least one other vehicle in the environment comprises at least one vehicle that is stopped ahead of the vehicle, and wherein the inference system infers that the state of the traffic signal is red based at least in part on the at least one vehicle that is stopped ahead of the vehicle.

3. The method of claim 1, wherein the traffic signal is at an intersection of a first roadway and a second roadway, and wherein the vehicle is on the first roadway.

4. The method of claim 3, wherein the status of the at least one other vehicle in the environment comprises at least one vehicle on the first roadway that is stopped at the intersection, and wherein the inference system infers that the state of the traffic signal is red based at least in part on the at least one vehicle on the first roadway that is stopped at the intersection.

5. The method of claim 3, wherein the status of the at least one other vehicle in the environment comprises at least one vehicle on the second roadway proceeding through the intersection, and wherein the inference system infers that the state of the traffic signal is red based at least in part on the at least one vehicle on the second roadway proceeding through the intersection.

6. The method of claim 3, wherein controlling the vehicle in the autonomous mode based on the inferred state of the traffic signal comprises controlling the vehicle to stop at the intersection.

7. The method of claim 3, wherein controlling the vehicle in the autonomous mode based on the inferred state of the traffic signal comprises controlling the vehicle to proceed through the intersection.

8. The method of claim 1, further comprising:
    obtaining subsequent sensor data from the one or more sensors, wherein the subsequent sensor data indicates a subsequent status of the at least one other vehicle in the environment;
    using the inference system to make a subsequent inference regarding the state of the traffic signal based on the subsequent status of the at least one other vehicle in the environment; and
    controlling the vehicle in the autonomous mode based on the subsequent inference regarding the state of the traffic signal.

9. The method of claim 1, wherein obtaining sensor data comprises using at least one of a camera, a radar system, or a lidar system.

10. The method of claim 1, wherein the status of the at least one other vehicle comprises a state of a brake light of the at least one other vehicle.

11. A vehicle, comprising:
    one or more sensors, wherein the one or more sensors are configured to acquire sensor data regarding an environment of the vehicle, wherein the vehicle is configured to operate in an autonomous mode, wherein the environment includes a traffic signal that is not observed by the one or more sensors, and wherein the sensor data indicates a status of at least one other vehicle in the environment;
    an inference system, wherein the inference system is configured to infer a state of a traffic signal based on the status of the at least one other vehicle in the environment; and
    a control system, wherein the control system is configured to control the vehicle in the autonomous mode based on the inferred state of the traffic signal.

12. The vehicle of claim 11, wherein the one or more sensors comprise at least one of a camera, a radar system, or a lidar system.

13. The vehicle of claim 11, wherein the traffic signal is at an intersection of a first roadway and a second roadway, and wherein the vehicle is on the first roadway.

14. The vehicle of claim 13, wherein the status of the at least one other vehicle in the environment comprises at least one vehicle that is stopped on the first roadway at the intersection, and wherein the inference system infers that the state of the traffic signal is red based at least in part on the at least one vehicle that is stopped on the first roadway at the intersection.

15. The vehicle of claim 13, wherein the status of the at least one other vehicle in the environment comprises at least one vehicle on the second roadway proceeding through the intersection, and wherein the inference system infers that the state of the traffic signal is red based at least in part on the at least one vehicle on the second roadway proceeding through the intersection.

16. A non-transitory computer readable medium having stored therein instructions executable by a computer system to cause the computer system to perform functions, the functions comprising:
  obtaining sensor data from one or more sensors observing an environment of a vehicle, wherein the one or more sensors are operationally associated with the vehicle, wherein the vehicle is configured to operate in an autonomous mode, wherein the environment includes a traffic signal that is not observed by the one or more sensors, and wherein the sensor data indicates a status of at least one other vehicle in the environment;
  using an inference system to infer a state of the traffic signal based on the status of the at least one other vehicle in the environment; and
  controlling the vehicle in the autonomous mode based on the inferred state of the traffic signal.

17. The non-transitory computer readable medium of claim 16, wherein the status of the at least one other vehicle in the environment comprises at least one vehicle that is stopped ahead of the vehicle, and wherein the inference system infers that the state of the traffic signal is red based at least in part on the at least one vehicle that is stopped ahead of the vehicle.

18. The non-transitory computer readable medium of claim 16, wherein the traffic signal is at an intersection of a first roadway and a second roadway, and wherein the vehicle is on the first roadway.

19. The non-transitory computer readable medium of claim 18, wherein the status of the at least one other vehicle in the environment comprises at least one vehicle on the first roadway that is stopped at the intersection, and wherein the inference system infers that the state of the traffic signal is red based at least in part on the at least one vehicle on the first roadway that is stopped at the intersection.

20. The non-transitory computer readable medium of claim 18, wherein the status of the at least one other vehicle in the environment comprises at least one vehicle on the second roadway proceeding through the intersection, and wherein the inference system infers that the state of the traffic signal is red based at least in part on the at least one vehicle on the second roadway proceeding through the intersection.

* * * * *